United States Patent [19]
Collins

[11] Patent Number: 5,899,650
[45] Date of Patent: May 4, 1999

[54] SLAB CART

[76] Inventor: Travis L. Collins, 336 N. Spring St., Everett, Pa. 15537

[21] Appl. No.: 08/895,775

[22] Filed: Jul. 17, 1997

[51] Int. Cl.[6] ...................................................... B62B 3/10
[52] U.S. Cl. ...................... 414/10; 280/47.131; 280/47.11
[58] Field of Search .................. 414/10, 11; 280/47.131, 280/47.11, 87.01

[56]  References Cited

U.S. PATENT DOCUMENTS

| | | | |
|---|---|---|---|
| 1,303,691 | 5/1919 | Le Tempt et al. .................. | 280/47.131 |
| 1,520,630 | 12/1924 | Bateman ............................. | 280/47.131 |
| 2,291,474 | 7/1942 | Kalmbach .......................... | 280/47.131 |
| 3,580,601 | 5/1971 | Miles .................................. | 280/47.131 |
| 3,845,969 | 11/1974 | Nodeau .............................. | 280/47.131 |
| 4,695,067 | 9/1987 | Willey ................................ | 280/47.131 |
| 5,332,243 | 7/1994 | Berry ................................. | 280/47.131 |

FOREIGN PATENT DOCUMENTS

| 2296648 | 12/1990 | Japan .................................... | 280/79.7 |
|---|---|---|---|
| 8502401 | 4/1987 | Netherlands .......................... | 280/79.7 |

*Primary Examiner*—David A. Bucci
*Assistant Examiner*—Gregory A. Morse
*Attorney, Agent, or Firm*—Lalos & Keegan

[57]  ABSTRACT

An improved slab cart is disclosed for the transport of a slab including a slab of marble, granite, stone, glass, and heavy objects. A first frame assembly attaches to a first end of a slab and a second assembly attaches to a second end of a slab. The first and second frame assemblies are coupled to the slab in such a manner as to support the slab in an upright position. The first and second frame assemblies each have a pair of elongated frame members and wheels mounted thereto for further supporting the slab and allowing the slab to roll freely without damaging surfaces upon which the slab cart may roll. The slab cart of the present invention is further provided with clamps coupled to the frame assemblies for engaging the slab in clamping relation. A retaining pin couples the ends of each frame member of each frame assembly preventing the frame members from spreading when the clamps are engaged.

10 Claims, 2 Drawing Sheets

5,899,650

SLAB CART

FIELD OF THE INVENTION

The present invention is in the field of transportation devices. In particular, the present invention relates to an improved cart for transporting slabs of stone, or heavy objects of various sizes and weights.

BACKGROUND OF THE INVENTION

Transporting slabs of dense material presents particular challenges given the weight, size, and potential for breakage of hard material configured as a slab. A variety of devices are available to assist in handling and transporting large slabs of marble, granite, glass, or otherwise flat, hard, and heavy objects. A stone slab may be transported between cutting area, finishing area, staging area and worksite using devices such as a wheeled cart or like means. Unique problems arise however in handling stone slabs due to their sheer size and weight. The large and unwieldy nature of a typical slab gives rise to additional problems during maneuvers such as ascending inclines, negotiating corners and the like.

Stone slabs must be supported in an upright position during transport in order to prevent breakage and to allow a proper fit through restricted spaces such as doorways, narrow hallways, and the like. In addition, breakage is more likely when a slab is carried flat not only due to increased probability of contact with obstacles but because of the inherent weakness of a slab in the cross sectional direction. Although the upright position is most suitable for slab transport, the slightest tipping or urging in a lateral direction must be avoided. The slab's great weight will carry it over quickly during a fall.

Consequently, it is difficult to find suitable means for supporting a slab in an upright position during rolling and for maintaining upright stability when obstacles and the like are encountered. Upright instability can be attributed in part to the limitations posed on the placement of the center of gravity for the cart due to the position of the wheel axles for the cart. The placement of cart wheel axles in particular limit the placement of the slab to a position above the wheel axles. Placement of the wheel axles prevents the lowering of the center of gravity and limits the stability of the cart regardless of the size of the wheels.

Prior art stone carts exist that assist in dealing with the sheer weight of a stone slab. Maneuvering the stone slab over worksite obstacles while maintaining upright stability may still be problematic for prior art carts. Some prior art stone carts, in order to handle the sheer weight of the heaviest slab likely to be encountered are typically constructed with small diameter metal wheels. Metal wheels, impressed with the weight of a large slab, are a problem however when rolling across finished floors or carpets. Such hard wheels combined with slab weight often leave marks or cause actual physical damage. Other prior art carts are limited by their fixed physical configuration which arises in an effort to accommodate slabs of different sizes.

One such prior art device is disclosed in U.S. Pat. No. 3,580,601 issued to Miles. The disclosed skate device allows for the transport of large objects but has characteristic disadvantages associated with devices of this and like kind. Because of the fixed length of the skate, longer objects placed upon the skate contact the surface of an incline before the first wheel of the skate. Such a situation gives rise to the potential for damage to slab corners and may prevent successful negotiation of the incline all together.

Attempting to accommodate all object sizes is problematic however for a device such as that disclosed in Miles which purports to be a multi-purpose device. Since objects of many sizes must be accommodated, a single average length must be used for the skate construction. A skate optimized for longer objects would be inefficient for handling shorter objects and vice versa.

In addition to the disadvantages already mentioned, other disadvantages are known to those skilled in the art. For example, although rubber tires are disclosed in Miles as a replacement for aluminum or resin rollers, they are nevertheless disadvantageous in that they are of a solid rubber construction. Solid rubber tires are known in the art to present many of the same disadvantages as metal rollers in terms of leaving marks or causing actual physical damage as described above especially when more delicate surfaces are encountered.

OBJECTS OF THE INVENTION

It is an object of the invention therefore to provide a stone cart for transporting stone slabs that does not leave marks or damage floor surfaces. A cart of this type would be advantageous for providing slab rolling capabilities on finished surfaces.

It is another object of the invention to provide a slab cart that would allow for the handling of slabs of many sizes by being individually fit to each slab. Such a slab cart would support the slab in a manner allowing it to easily handle inclines and other workspace obstacles.

It is still a further object of the invention to provide lateral support to stabilize the slab in the upright position. Such a cart would provide upright stability during transport and prevent falling of the slab or the slab and cart when encountering obstacles and the like.

SUMMARY OF THE INVENTION

The improved slab cart of the present invention comprises a first and second assembly attached respectively to each end of a slab requiring transport. The assemblies are coupled to the slab to support the slab in an upright position. Each individual assembly comprises a frame for providing support for the slab. Each frame is made up of two elongated frame members joined at the bottom by a common inner U-shaped bracket. Each elongated frame member is further provided with an individual outer bracket. An axle is coupled between the common inner bracket and each of the two outer brackets for mounting a wheel on either side of the frame assembly. A wheel and an axle are disposed between each of the outer brackets and the common inner bracket.

The inner U shaped bracket, has a substantial portion at the base of the U located below the geometric axis of the wheel. The inner bracket thus provides a lower center of gravity for the cart as a whole improving stability. Each inner bracket and outer bracket pair has at least two tires coupled between for load bearing and rolling purposes. The trough of the U-shaped inner bracket functions as a cradle and engages the lower most edge of the slab providing support and stability for the slab. Since the lowest portion of the cradle lies below the position of the axle, stability is improved for the entire system which includes the slab, and two frame assemblies connected to the slab at each end.

A series of clamps are disposed at points along the length of each elongated frame member. The clamps engage the slab at these points to secure the slab within each frame assembly. The clamps are provided with a threaded shaft, a key tab on the outer end of the threaded shaft for facilitating hand tightening of the clamp, and a contact surface on the inner end of the threaded shaft for making positive contact against the surface of the slab. The contact surface is a flat, round metal surface which meets the surface of the slab in parallel relation. As the key tab is turned, typically in the clockwise direction while facing the slab, the contact surfaces make progressively more positive contact with the slab until the desired clamping pressure is reached.

Since tightening the clamps results in a corresponding outward force applied to the elongated frame members, retaining pins are required at the ends of each pair of frame members. Retaining pins extend through holes at each end of each frame member and are fixed with a retaining clip extending through a hole in the end of each retaining pin. The retaining clip prevents the retaining pin from sliding out of the holes in the elongated frame members. The retaining pins are placed at the ends of the elongated frame members to prevent spreading as the clamps are tightened against the slab.

DETAILED DESCRIPTION OF THE INVENTION

Figure 1A:
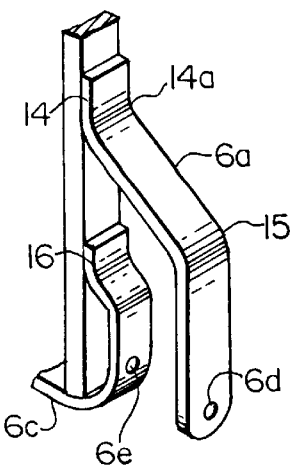
FIG. 1A is a drawing detail illustrating the inner and outer brackets of the present invention.

The improved slab cart of the present invention is specially adapted to carry stone slabs of various sizes without presenting the many disadvantages of prior art carts. The objects of the invention are accomplished by means of the slab cart as best shown in FIG. 1 of the drawings.

Independent frame assemblies 4 and 5 are placed, one at each end of slab 1, without regard to slab length. Slab 1 may be a sheet or slab of marble, granite, or any other stone, glass, or heavy object handled as a sheet or slab. Slab 1 may further be short or long and may have an extensive or narrow width. Frame assemblies 4 and 5 are placed into operative position by sliding each individual frame assembly 4 and 5 over the ends of slab 1 while it is oriented in the sideward and upright position and lifted slightly. Frame assemblies 4 and 5 are best placed on the ends of slab 1 along an axis with the longest dimension. It is apparent that in order to further secure slab 1 and provide rolling action, frame assemblies 4 and 5 are further equipped with wheels 6 and 7, clamps 8 and 9, and pins 10 and 11 all of which are described hereinafter in greater detail.

To provide lateral support for slab 1, frame assemblies 4 and 5 each have two elongated frame members 4a and 5a which are spaced a small distance apart relative to their length and extend upwards a distance sufficient to accommodate the largest typical slab width. In the preferred embodiment, members 4a and 5a may be around 6 feet in length. Members 4a and 5a are spaced by a distance 4b and 5b which may be based on the typical or desired slab thickness. A variety of spacings 4b and 5b may be used to accommodate a variety of slab thicknesses without departing from the scope of the invention. In the preferred embodiment however, distances 4b and 5b may be around 6 inches.

Figure 2:
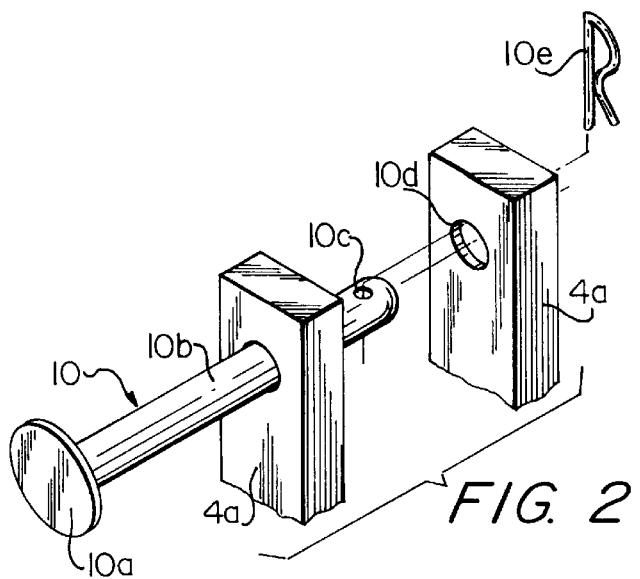
FIG. 2 is a drawing detail illustrating the retaining pin of the present invention.
Figure 3:
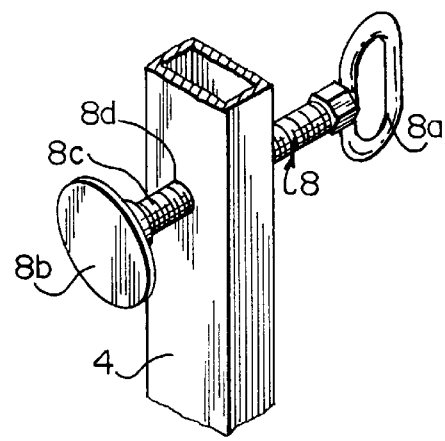
FIG. 3 is a drawing detail illustrating the slab clamp of the present invention.

Referring now to FIGS. 2 and 3 of the drawings, pin 10 and clamps 8 of frame assembly 4 are shown in greater detail; it being apparent that corresponding details are identically present in pin 11 and clamp 9 of frame assembly 5 although these are not specifically shown in the figures. Pin 10 and pin 11 are preferably constructed of a resilient metal material with great longitudinal as well as shear strength since it must withstand primarily pulling and shear forces. Pins 10 and 11 are further constructed from a material harder than the material from which frame member 4a and 5a are constructed to avoid destruction of pins 10 and 11 during slab transport. Pin 10, as shown in FIG. 2 of the drawings, comprises head 10a, shaft 10b, and hole 10c for accommodating retaining clip 10e. Pin 11 is equipped with identical elements. Head 10a comprises a flat round head which prevents the pin from sliding through holes 10d. Holes 10d are placed at the top of frame members 4a and are ideally of a diameter just large enough to accommodate the diameter of pin 10. Excess diameter in holes 10d may cause a sawing action by frame members 4a upon pin 10 in the shear direction leading to premature failure of pin 10. Pin 10 is placed through holes 10d in frame members 4a and secured by placing retaining clip 10e through hole 10c. Pins 10 and 11 perform the function of preventing frame members 4a and 5a from spreading apart as clamps 8 and 9 are tightened.

Clamps 8, one side of which is shown in detail in FIG. 3, comprises thumb key 8a and contact surface 8b disposed on either end of threaded shaft 8c. Clamps 9 are identically equipped. Threaded shaft 8c extends through frame bar 4a by means of threaded hole 8d and is thereby tightened. Threaded hole 8d may be constructed by cutting threads directly into the material from which frame members 4a are made or may be accomplished by means of a threaded insert or boss. Clamps 8 comprise at least two sets of opposing clamps spaced evenly along the length of frame members 4a. The opposing relation of clamps 8 is best illustrated in FIG. 4.

Figure 4:
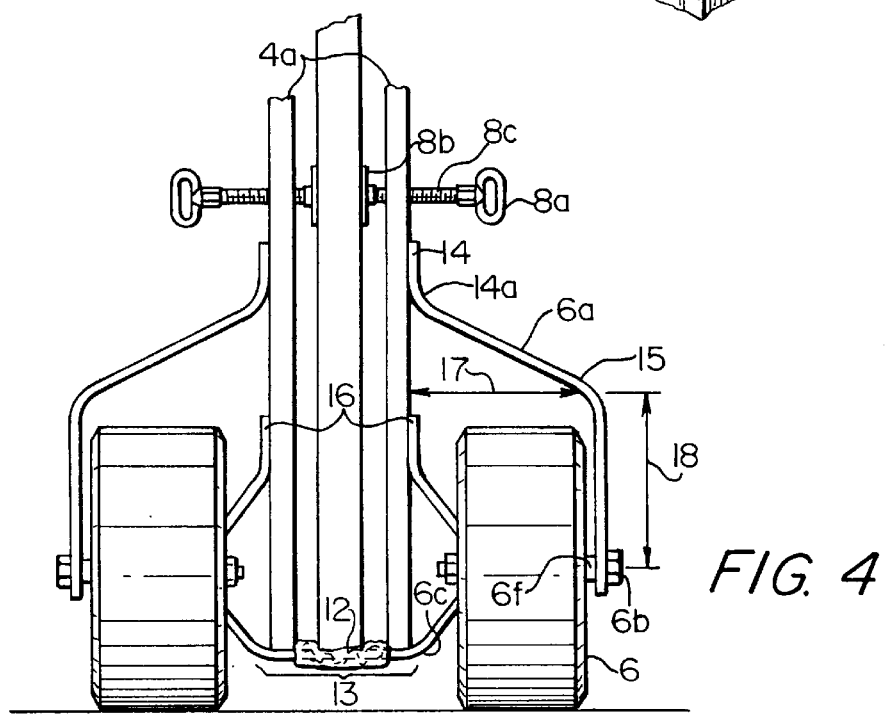
FIG. 4 is a drawing detail illustrating the inner and outer brackets, wheels, lower slab clamps, slab cushion, and partial details of the frame and slab.

FIG. 4 further illustrates the construction of inner wheel bracket 6c and outer wheel brackets 6a as disposed upon frame assembly 4 and frame members 4a. As with other drawings, FIG. 4 illustrates the construction of a portion the present invention as it is embodied in frame assembly 4. Frame assembly 5, though not shown in FIG. 4, is identical in construction with, for example, wheels 7, clamps 9, and pin 11. Referring again to FIG. 4, wheel 6, preferably a pneumatic tire, is disposed on heavy duty axle assembly 6b which can be an integral heavy duty axle assembly coupled to wheel 6 and secured by heavy duty bolt 6b, or may comprise an axle assembly 6f to which wheel 6 is mounted. In the preferred embodiment, wheel 6 comprises an integral axle and bearing assembly through which bolt 6b is passed. Heavy duty axle assembly in turn is mounted on either end to outer and inner brackets 6a and 6c respectively.

Figure 1:
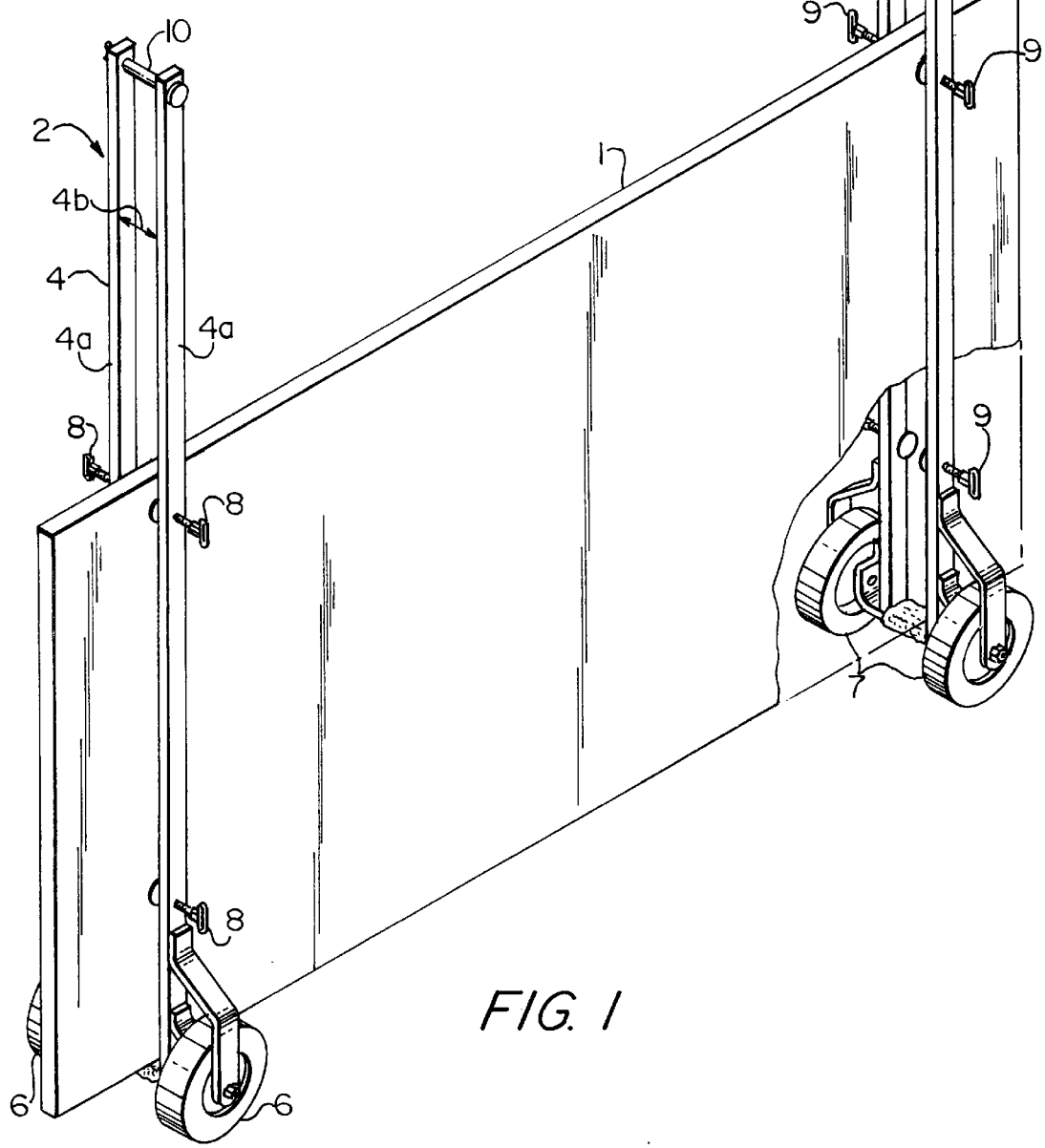
FIG. 1 is a drawing illustrating the slab cart of the present invention.

Outer bracket 6a as shown in FIG. 1A and FIG. 4 comprises a sturdy metal section welded at point 14, well above the lower end of frame bar 4a, and extending outward by means of an immediate bend 14a after the weld away from frame bar 4a. Downward bend 15 is made at a distance 17 sufficiently outward of frame member 4a to accommodate the width of wheel 6 resulting in outer bracket 6a running parallel to frame member 4a. Finally, a downward extension of sufficient length 18 accommodates the radius of wheel 6 plus some additional clearance. As best shown in FIG. 1A, hole 6d at the end of outer bracket 6a accommodates one end of axle assembly 6f while the other end of axle assembly 6f is accommodated by corresponding hole 6e in inner bracket 6c. In the preferred embodiment axle assembly 6f is secured by a heavy duty bolt extending through both holes 6d and 6e in outer bracket 6a and inner bracket 6c securing wheel 6 to frame assembly 2.

Inner bracket 6c comprises an integral, U-shaped sturdy metal section which is welded at points 16 some distance above the end of each of frame members 4a but below the weld point 14 for outer brackets 6a. Inner bracket 6c extends between the outer sides of both frame members 4a forming a cradle section 13 which directly supports slab 1. Cushion 12 is fixed to cradle section 13 in order to protect slab 1 from chipping or breakage resulting from direct contact with the metal of inner bracket 6c. Referring again to FIG. 4 of the drawings, note that cradle section 13 extends below the axle center of wheel 6 providing improved support and sufficient stability for the entire cart to stand independently in the upright position.

The descriptions herein are by way of example only illustrating the preferred embodiment of the present invention. However, the method and apparatus of the present invention may be applied in a similar manner in other embodiments without departing from the spirit and scope of the invention.

I claim:

1. An improved slab cart for transporting a slab across a surface, said slab cart comprising:
    a first frame assembly for attaching to a first end of said slab and for supporting and transporting said slab in rolling relation to said surface;
    a second frame assembly for attaching to a second end of said slab and for further supporting and transporting said slab in rolling relation to said surface, wherein each of said first and second frame assemblies further comprises:
        a first and second elongated vertical frame member spaced apart forming a slab space therebetween for providing support for said slab disposed in an upright position within said slab space;
        at least one clamp disposed in spaced relation upon said first and second frame membrs and extending from outside of said frame member into said slab space for engaging said slab in clamping relation;
        a retaining pin coupled between said first and second frame members for preventing said first and second frame members from spreading apart when said plurality of clamps is engaged; and
        a wheel support assembly coupled to said first and second frame member for mounting at least one wheel thereto and for further supporting said slab,
    an inner bracket coupled to said first and said second frame members;
    a first and a second outer bracket coupled to said first and said second frame members respectively; and
    a first and second tire assembly including a first and second axle respectively coupled to said inner bracket and said first and second outer bracket respectively for engaging said surface in rolling relation.

2. A slab cart according to claim 1, wherein said inner bracket is substantially U-shaped forming a slab supporting surface and the slab supporting surface of said inner bracket extends below the axis of said first and second axle.

3. A slab cart according to claim 2, wherein said slab supporting surface of said inner bracket further comprises a cushioning material disposed thereupon for protecting said edge of said slab.

4. A slab cart according to claim 3, wherein said first and second tire assembly each further comprises:
    a pneumatic tire; and
    a wheel around which said pneumatic tire is disposed wherein said wheel may further be mounted on one of said axles directly to said inner bracket and said first and second outer brackets.

5. An improved slab cart for transporting a slab across a surface, said slab cart comprising:
    a first frame assembly for attaching to a first end of said slab and for supporting and transporting said slab in rolling relation to said surface;
    a second frame assembly for attaching to a second end of said slab and for further supporting and transporting said slab in rolling relation to said surface, wherein each of said first and second frame assemblies further comprises:
        a first and second elongated vertical frame member spaced apart forming a slab space therebetween for providing support for said slab disposed in an upright position within said slab space;
        at least one clamp disposed in spaced relation upon siad first and second frame members and extending from outside of said frame member into said slab space for engaging said slab in clamping relation;
        a retaining pin coupled between said first and second frame members for preventing said first and second frame members from spreading apart when said plurality of clamps is engaged;
        a wheel support assembly coupled to said first and second frame member for mounting at least one wheel thereto and for further supporting said slab;
    an inner bracket coupled to said first and said second frame members;
    a first and a second outer bracket coupled to said first and said second frame members respectively.

6. A slab cart according to claim 5, wherein said first and a second axle are mounted between said first and said second outer brackets and said inner bracket and are further provided with pneumatic tires.

7. An improved slab cart for transporting a slab across a surface, said slab cart comprising:
    a first frame assembly for attaching to a first end of said slab and for supporting and transporting said slab in rolling relation to said surface; and
    a second frame assembly for attaching to a second end of said slab and for further supporting and transporting said slab in rolling relation to said surface, wherein each of said first and second frame assemblies further comprises:
        a first and second elongated vertical frame member spaced apart forming a slab space therebetween for providing support for said slab disposed in an upright position within said slab space;
        at least one clamp disposed in spaced relation upon said first and second frame members and extending from outside of said frame member into said slab space for engaging said slab in clamping relation;
        a wheel support assembly coupled to said first and second frame member for mounting at least one wheel thereto and for further supporting said slab;
        said wheel support assembly having an axle for each wheel; and
        an inner slab support bracket coupled to said first and second frame members and extending below the axis of each said axle to support said slab.

8. The slab cart of claim 7 including,
said inner bracket is substantially U-shaped.

9. The slab cart of claim 7 including,
a retaining pin coupled between said first and second frame members for preventing said first and second frame members from spreading apart when said plurality of clamps are engaged.

10. The slab cart of claim 7 including,
said inner bracket is substantially U-shaped, and
a retaining pin coupled between said first and second frame members for preventing said first and second frame members from spreading apart when said plurality of clamps is engaged.

* * * * *

UNITED STATES PATENT AND TRADEMARK OFFICE
CERTIFICATE OF CORRECTION

PATENT NO. : 5,899,650
DATED : May 4, 1999
INVENTOR(S) : Travis L. Collins

It is certified that error appears in the above-identified patent and that said Letters Patent is hereby corrected as shown below:

In Claim 3, lines 3 and 4, delete "said edge of".

Signed and Sealed this

Twelfth Day of October, 1999

*Attest:*

Q. TODD DICKINSON

*Attesting Officer*   Acting Commissioner of Patents and Trademarks